United States Patent
Teboulle et al.

(10) Patent No.: US 12,277,613 B2
(45) Date of Patent: Apr. 15, 2025

(54) METHOD FOR RECONNECTING A SMART ELECTRICITY METER AND SMART ELECTRICITY METER IMPLEMENTING SAID METHOD

(71) Applicant: SAGEMCOM ENERGY & TELECOM SAS, Rueil Malmaison (FR)

(72) Inventors: Henri Teboulle, Rueil Malmaison (FR); Ziv Roter, Rueil Malmaison (FR); Jean-Philippe Berger, Rueil Malmaison (FR); Jérémie Sergi, Rueil Malmaison (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 174 days.

(21) Appl. No.: 17/989,114

(22) Filed: Nov. 17, 2022

(65) Prior Publication Data
US 2023/0162298 A1 May 25, 2023

(30) Foreign Application Priority Data
Nov. 19, 2021 (FR) ..................................... 2112258

(51) Int. Cl.
*G06Q 50/06* (2024.01)
*H04W 4/70* (2018.01)

(52) U.S. Cl.
CPC ............. *G06Q 50/06* (2013.01); *H04W 4/70* (2018.02)

(58) Field of Classification Search
None
See application file for complete search history.

(56) References Cited

U.S. PATENT DOCUMENTS

| 2013/0154850 A1* | 6/2013 | Chan | G08C 19/00 340/870.02 |
| 2014/0225742 A1* | 8/2014 | Wenger | G01D 4/002 340/870.02 |

FOREIGN PATENT DOCUMENTS

| EP | 3 709 671 A1 | 9/2020 |
| FR | 3 081 642 A1 | 11/2019 |

OTHER PUBLICATIONS

Jul. 25, 2022 Search Report issued in French Patent Application No. 2112258.

* cited by examiner

*Primary Examiner* — Mohammad Ali
*Assistant Examiner* — Saad M Kabir
(74) *Attorney, Agent, or Firm* — Williams Mullen; R. Brian Drozd

(57) ABSTRACT

A method for connecting a smart electricity meter connected to a data concentrator, referred to as the current data concentrator, in a powerline or radio-frequency communication network for the automated management of metering in the context of an electrical distribution service is described. The smart electricity meter disconnects from the current data concentrator in the case where the latter is posing a problem. It next attaches itself to a neighbouring data concentrator different from the current data concentrator. It then listens to the frames containing an identifier of said current data concentrator. Finally, it disconnects from the neighbouring data concentrator and attaches itself to a data concentrator using the same identifier as the current data concentrator when at least N frames containing the identifier of the current data concentrator are received, with N an integer greater than or equal to 1.

14 Claims, 10 Drawing Sheets

METHOD FOR RECONNECTING A SMART ELECTRICITY METER AND SMART ELECTRICITY METER IMPLEMENTING SAID METHOD

TECHNICAL FIELD

The present invention relates to powerline or radio-frequency communication networks for automated meter management (AMM) systems. More particularly, at least one embodiment relates to a method for reconnecting a smart electricity meter in a powerline or radio-frequency communication network for automated metering management in the context of an electrical distribution service.

PRIOR ART

Powerline communication systems for automated metering management AMM systems have made their appearance during the past few years, in particular in the context of electrical distribution services. The G3-PLC standard specified in the ITU-T recommendation G.9903 can for example be cited. In such powerline communication networks, communications are established between electricity meters, referred to as smart electricity meters, and a concentrator node, sometimes referred to as a data concentrator or base node or coordinator, to allow in particular a remote automated reading of electrical consumption measurements made by said smart electricity meters and in general to allow remote control of the smart electricity meters. A plurality of data concentrators are then geographically deployed to distribute the load of collecting meter readings from the smart electricity meters. Each data concentrator then serves as a relay between a set of smart electricity meters and a management entity of the automated metering management AMM system that is responsible for processing the meter readings in a centralised manner.

For several years, communication networks have also been able to operate in hybrid powerline/radio-frequency mode so as to make it possible to increase the collecting performances. The G3-PLC standard specified in the ITU-T recommendation G.9903 as from the 2021 version, which incorporates hybrid mode, can for example be cited.

In the case where a data concentrator breaks down, it is known that the smart electricity meters that were attached to it attempt to connect to data concentrators located in their geographical neighbourhood. However, such a solution creates imbalances in the network, some data concentrators being able to find themselves managing the reading of electrical consumption measurements of a large number of smart electricity meters whereas other data concentrators, on the contrary, are managing the reading of electrical consumption measurements only for a very small number of smart electricity meters.

It is then desirable to overcome these drawbacks of the prior art. It is in particular desirable to provide a solution that makes it possible to distribute the load of collecting meter readings in a balanced manner between the various data concentrators.

DISCLOSURE OF THE INVENTION

A first embodiment relates to a method for reconnecting a smart electricity meter connected to a data concentrator, referred to as the current data concentrator, in a powerline or radio-frequency communication network for automated metering management in the context of an electrical distribution service. The method comprises the following steps implemented by said smart electricity meter:
  disconnecting from the current data concentrator in the case where said current data concentrator is posing a problem;
  connecting to a neighbouring data concentrator different from said current data concentrator;
  listening to the frames containing an identifier of said current data concentrator;
  disconnecting from the neighbouring data concentrator and reconnecting to a data concentrator using the same identifier as the current data concentrator when at least N frames containing the identifier of said current data concentrator are received, with N an integer greater than or equal to 1.

The method allows a rebalancing of the load of collecting metering readings between the various data concentrators, following for example a breakdown of the current data concentrator, and allowing in particular an automatic reconnection to a replacement data concentrator using the same identifier as the broken-down data concentrator.

In a particular embodiment, disconnecting from the neighbouring data concentrator and reconnecting to a data concentrator using the same identifier as the current data concentrator when at least N frames containing the identifier of said current data concentrator are received comprises disconnecting from the neighbouring data concentrator and reconnecting to a data concentrator using the same identifier as the current data concentrator when at least N frames containing the identifier of said current data concentrator are received and a quality of link between said smart electricity meter and said data concentrator using the same identifier as the current data concentrator is above a predefined threshold value.

In a particular embodiment, the method comprises a step consisting in determining that said current data concentrator is posing a problem when said smart electricity meter has received no frame from said current data concentrator during a predefined time T0.

In a particular embodiment, the method comprises a step consisting in determining that said current concentrator is posing a problem when said smart electricity meter has received no frame from said current data concentrator during a predefined time T0 or the quality of exchanges of frames between said smart electricity meter and the current data concentrator is insufficient, and provided that said smart electricity meter is listening to a neighbouring data concentrator different from said current data concentrator.

In a variant, the method comprises a step consisting in determining that said current data concentrator is posing a problem when a time elapsed since the last reception by said smart electricity meter of a specific frame representing an activity of the current data concentrator is greater than or equal to a predefined time T0.

According to a particular feature, T0 is equal to 24 hours.

In a particular embodiment, said current data concentrator is a data concentrator for which the connection with said smart electricity meter has functioned without anomaly for a predefined time T.

According to a particular feature, T is equal to one week.

In a particular embodiment, the smart electricity meter establishes an ordered list L of data concentrators to which to potentially connect, the smart electricity meter reorganises the list L by placing the favourite data concentrator at the start of the list if the value of a counter of failures of connection to said favourite data concentrator is below a predefined threshold T7, and the smart electricity meter reorganises the list L by placing the neighbouring data concentrator from which said smart electricity meter has disconnected at the end of the list.

According to a particular characteristic, T7 is equal to 3

In a particular embodiment, connecting to a neighbouring data concentrator comprises:

putting the identifier of the current data concentrator on a blacklist for a predefined time T1;

starting a process of connection to a data concentrator of the network to connect to a neighbouring data concentrator different from said current data concentrator.

According to a particular feature, T1 is equal to 24 hours.

At least one embodiment relates to a smart electricity meter connected to a data concentrator, referred to as the current data concentrator, in a powerline or radio-frequency communication network for automated metering management in the context of an electrical distribution service. The smart electricity meter comprises:

means for disconnecting from the current data concentrator in the case where said current data concentrator is posing a problem;

means for connecting to a neighbouring data concentrator different from said current data concentrator;

means for listening to frames containing the identifier of said current data concentrator;

means for disconnecting from the neighbouring data concentrator and for connecting to a data concentrator using the same identifier as the current data concentrator when at least N frames are received, with N an integer greater than or equal to 1.

A computer program product is also described that comprises instructions for implementing the reconnection method according to any one of the preceding embodiments, when said program is executed by a processor.

A storage medium is also described that stores a computer program comprising instructions for implementing the reconnection method according to any one of the preceding embodiments, when said program is executed by a processor.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1:
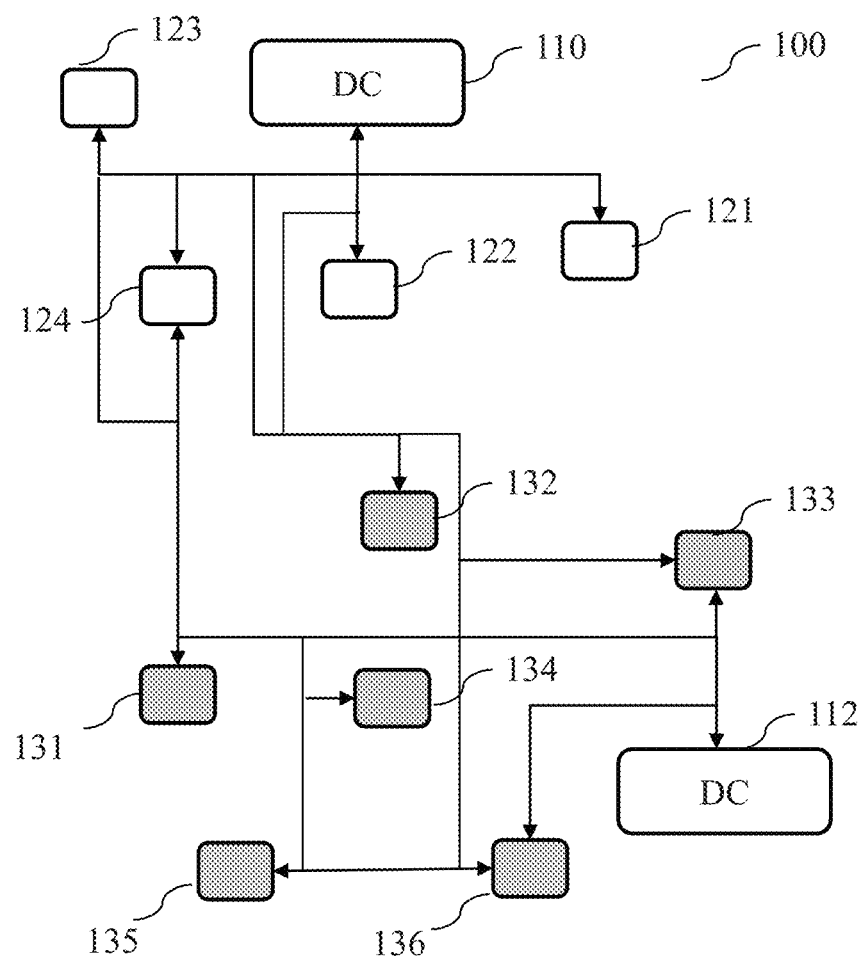
FIG. 1 illustrates schematically an example of a communication system supporting an automated metering management AMM in the context of electrical distribution services.

FIG. 1 thus illustrates schematically an example of a communication system supporting an automated metering management AMM in the context of electrical distribution services, wherein the present invention is implemented.

The communication system comprises at least one powerline communication network PLCN 100, simply referred to as PLCN network 100 hereinafter, deployed logically on an electrical supply network. The PLCN network 100 allows the establishment of an automated metering management AMM system in the context of the electrical distribution services. In a variant of the powerline communication network PLCN, the communication system may comprise a radio-frequency communication network. For example, the communication system implements a hybrid mode wherein the automated metering management AMM relies on a powerline communication network PLCN or on a radio-frequency communication network. Hereinafter, the invention is described more particularly in a context of a powerline communication network PLCN, but applies in a similar manner in a radio-frequency communication network context.

The communication system comprises a plurality of particular node devices, referred to as data concentrators DC 110 and 112. The PLCN network 100 is intended to make it possible to connect a plurality of node devices to the data concentrators DC 110 and 112. The node devices that the PLCN network 100 aims to connect to the data concentrators DC 110 and 112 are smart electricity meters SEM 121, 122, 123, 124, 131, 132, 133, 134, 135, 136. More precisely, the smart electricity meters 121 to 124 are connected to the data concentrator 110 and the smart electricity meters 131 to 136 are connected to the data concentrator 112. The data concentrators implement coordination functions and grant the smart electricity meters access to the network after authentication. The PLCN network 100 thus makes it possible to establish powerline communications so that the data concentrators DC 110 and 112 can in particular automatically proceed with operations of collecting electrical consumption metering readings, said metering being effected by the smart electricity meters with regard to electrical installations that said smart electricity meters are respectively responsible for monitoring. The PLCN network 100 furthermore enables the data concentrators DC 110 and 112 to proceed with application updating operations with smart electricity meters, and in general terms to remotely control said smart electricity meters. The powerline communications via the PLCN network 100 are for example in accordance with the G3-PLC protocol. In a variant, the powerline communications via the PLCN network 100 are in accordance with the PRIME specifications ("PoweRline Intelligent Metering Evolution", as defined in the ITU normative document G.9904). These protocols construct a logic communication network PAN (the English acronym for "Personal Area Network"), superimposed on the physical electrical network.

The communication system furthermore comprises an entity SI (not shown on FIG. 1) for managing the automated metering management AMM system, which is in particular responsible for processing the metering readings in a centralised manner. The management entity SI of the automated metering management AMM system takes for example the form of a server, or a set of servers, to which the data concentrators DC 110 and 112 are connected via cable or wireless communication links, for example of the GPRS ("General Packet Radio Service"), UMTS ("Universal Mobile Telecommunication System") or LTE ("Long-Term Evolution") type.

The data concentrators DC 110 and 112 perform the operations of collecting metering readings on behalf of the management entity SI with which they are identified by means of a network identifier PAN-ID (the English acronym for "Personal Area Network IDentifier"), e.g. in 16 bits, which is particular to them and which is attributed to them statically by the end user. In other words, the data concentrator DC 110 collects the metering readings from the smart electricity meters that are connected thereto (i.e. the smart electricity meters 121 and 124 of the PLCN network 100, and then supplies said readings to the management entity SI for processing.

In the same way, the data concentrator DC 112 collects the metering readings from the smart electricity meters that are connected thereto (i.e. the smart electricity meters 131 to 136 of the PLCN network 100), and then supplies said readings to the management entity SI for processing. The data concentrators DC 110 and 112 manage any retransmission requirements in the PLCN network 100 to ensure that the operations of collecting the metering readings take place correctly. It should be noted that a smart electricity meter may be connected to a data concentrator by means of other meters then serving as relays. This is because the size of the electricity network and its characteristics do not make it possible for all the smart electricity meters to transmit a message directly to a data concentrator. It is therefore necessary to use some meters as relays.

In the remainder of the document, the terms "connected" and "attached" are used interchangeably.

Figure 2:
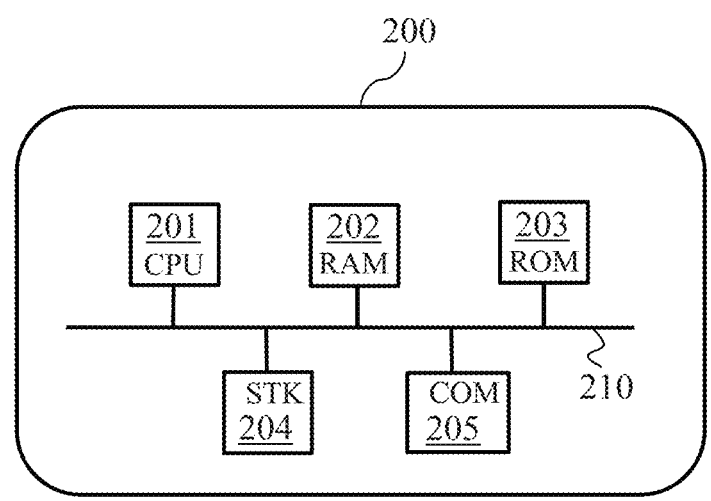
FIG. 2 illustrates schematically an example of hardware architecture of a smart electricity meter used in the communication system of FIG. 1.

FIG. 2 illustrates schematically an example of hardware architecture of a smart electricity meter 200 used in the communication system of FIG. 1.

According to the example of hardware architecture shown in FIG. 1, the smart electricity meter 200 then comprises, connected by a communication bus 210: a processor or CPU ("central processing unit") 201; a random access memory RAM 202; a read only memory ROM 203; a storage unit 204 such as a hard disk or such as a storage medium reader, e.g. an SD (Secure Digital) card reader; at least one communication interface 205 enabling the smart electricity meter to send information to a data concentrator or, where applicable, to receive therefrom.

The processor 201 is capable of executing instructions loaded in the RAM 202 from the ROM 203, from an external memory (not shown), from a storage medium (such as an SD card), or from a communication network. When the smart electricity meter 200 is powered up, the processor 201 is capable of reading instructions in the RAM 202 and executing them. These instructions form a computer program causing the implementation, by the processor 201, of all or some of the methods and steps described here.

The methods and steps described here can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

Thus the smart electricity meter 200 comprises electronic circuitry configured for implementing the methods and steps described here.

Figure 3:
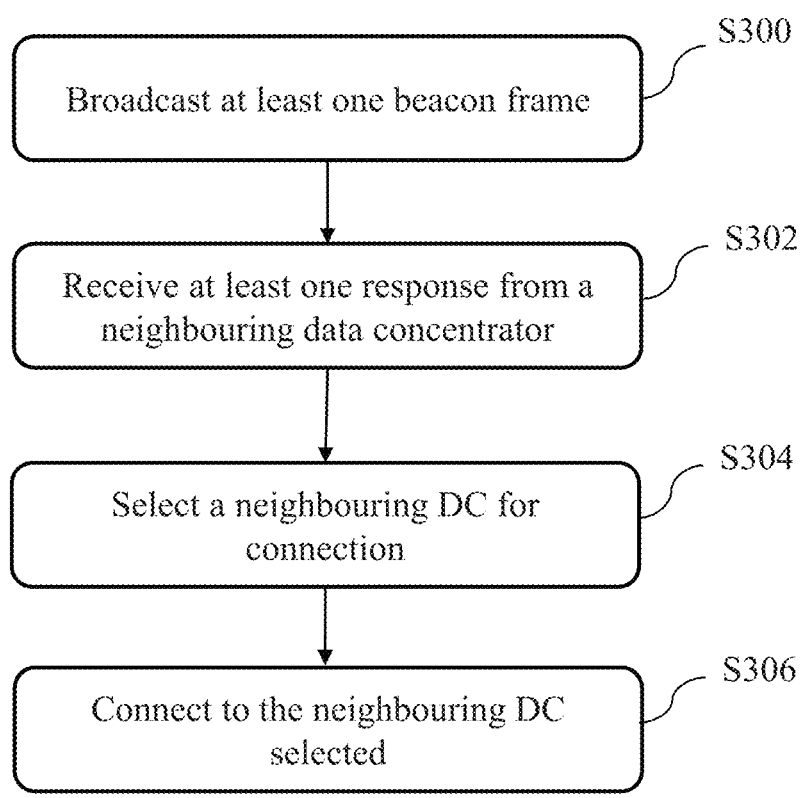
FIG. 3 illustrates schematically a method for connecting a smart electricity meter to a data concentrator according to the prior art.

FIG. 3 illustrates schematically a method for connecting a smart electricity meter to a data concentrator according to the prior art.

In a step S300, the smart electricity meter seeking to connect to a data concentrator broadcasts at least one beacon frame BeaconRequest in order to discover its near environment. This beacon frame BeaconRequest indicates that it wishes to connect to a data concentrator. This beacon frame BeaconRequest is received by neighbouring smart electricity meters and data concentrators, i.e. devices in a position to successfully receive and decode the beacon requests sent. They respond thereto by in their turn sending a beacon frame BeaconResponse that comprises the PAN-ID and the short MAC address (i.e. a temporary 16-bit address (the complete MAC address making 64 bits) attributed by the DC) that were attributed to them. It should be noted that the smart electricity meters already authenticated with a data concentrator are also able to respond to the BeaconRequest. They offer their services as "agent" for relaying the authentication request to the data concentrator to which they are attached.

In a step S302, the smart electricity meter receives a response BeaconResponse from at least some of the neighbouring smart electricity meters or data concentrators that received the beacon frame BeaconRequest. It should be noted that some neighbouring smart electricity meters or data concentrators that have received the beacon frame BeaconRequest may have sent a response that never reached the smart electricity meter.

Thus the responses received enable the meter to know its near environment and in particular to know the neighbouring data concentrators to which it is able to connect either directly or by means of a smart electricity meter intervening as "agent", i.e. serving as a relay between the smart electricity meter that sent the BeaconRequest and the data concentrator.

In a step S304, the smart electricity meter selects one of the neighbouring smart electricity meters or data concentrators from which it received a response. For example, the smart electricity meter selects the neighbouring smart electricity meter or data concentrator with which the quality of signal received, estimated on the BeaconResponse, is the best.

In a step S306, the smart electricity meter connects to the neighbouring data concentrator selected. This step generally comprises the authentication of the smart electricity meter by exchange of identification data between the smart electricity meter and the data concentrator, if necessary through smart electricity meters serving as relays. For example, in the case of the G3-PLC standard, the EAP-PSK authentication protocol is used. Once the smart electricity meter has been authenticated, the data concentrator gives it access to the network that it is coordinating and the smart electricity meter can then exchange data with it.

An example of such a connection method is for example described in the document of the G3-PLC alliance published in March 2017 and entitled "*Narrowband OFDM PLC specifications for G3-PLC networks*".

With reference to FIG. 1, considering that the data concentrator 110 breaks down at an instant t, generally at least one period tmin elapses, e.g. tmin=24 h, and less than tmax, e.g. tmax=5 days, before it is replaced. The durations of tmin and tmax mentioned above are given by way of indication and are configurable. Generally, after 24 h, i.e. at (t+24 h), there are no longer any frames comprising the identifier of the data concentrator 110 that has broken down circulating in the PLCN network 100, said frames emanating from the smart electricity meters previously connected to the data concentrator 110. Thus, after 24 h, the smart electricity meters previously connected to the data concentrator 110 are de facto disconnected therefrom. The smart electricity meters 121 to 124 that were connected to the data concentrator 110 will then seek to connect to a neighbouring data concentrator, e.g. to the data concentrator 112. In the prior art, the smart electricity meters 121 to 124, once connected to the data concentrator 112, remain connected thereto even when the data concentrator 110 is replaced by a new data concentrator. This creates imbalances in the network. On the other hand, according to the method of FIGS. 4 and 5, the data concentrator 112 serves as an attachment data concentrator for the smart electricity meters 121 to 124 in a transient manner, i.e. the time for which the broken-down data concentrator 110 is replaced by a new data concentrator or, if it is a case of a transient breakdown, when it begins to function correctly again. According to this embodiment, the new data concentrator is attributed the same identifier PAN-$ID_{110}$ as the data concentrator 110 that it is intended to replace.

Moreover, the new data concentrator is configured for broadcasting "ping" messages. In a variant, the new data concentrator is configured for broadcasting "ping" messages as long as the number of smart electricity meters that are connected to it is below a predefined threshold value, e.g. 10. These "ping" messages do not contain a payload but comprise the identifier of the new data concentrator, which is the same as the identifier PAN-$ID_{110}$ of the data concentrator 110 that it is intended to replace. The "ping" messages thus broadcast are listened to by the smart electricity meters previously connected to the data concentrator that the new DC replaces and which are at one hop from said new smart electricity meter, referred to as "$1^{st}$ hop" smart electricity meters. Thus the "$1^{st}$ hop" smart electricity meters implement the connection method described in relation to FIG. 4 or FIG. 5 in order to disconnect from any neighbouring DC and to connect to the new DC. By means of these "$1^{st}$ hop" smart electricity meters connected to the new DC, other smart electricity meters (previously connected to the data concentrator that the new DC replaces) will in their turn be able to listen to frames containing the PAN-ID of the old DC transmitted by said "$1^{st}$ hop" smart electricity meters, and undertake the method for connection to this new DC described in relation to FIG. 4 or FIG. 5. A variant embodiment is also described below in relation to FIG. 6 et seq, in the context of a management of connection of a smart electricity meter to a data concentrator according to a particular embodiment.

Figure 4:
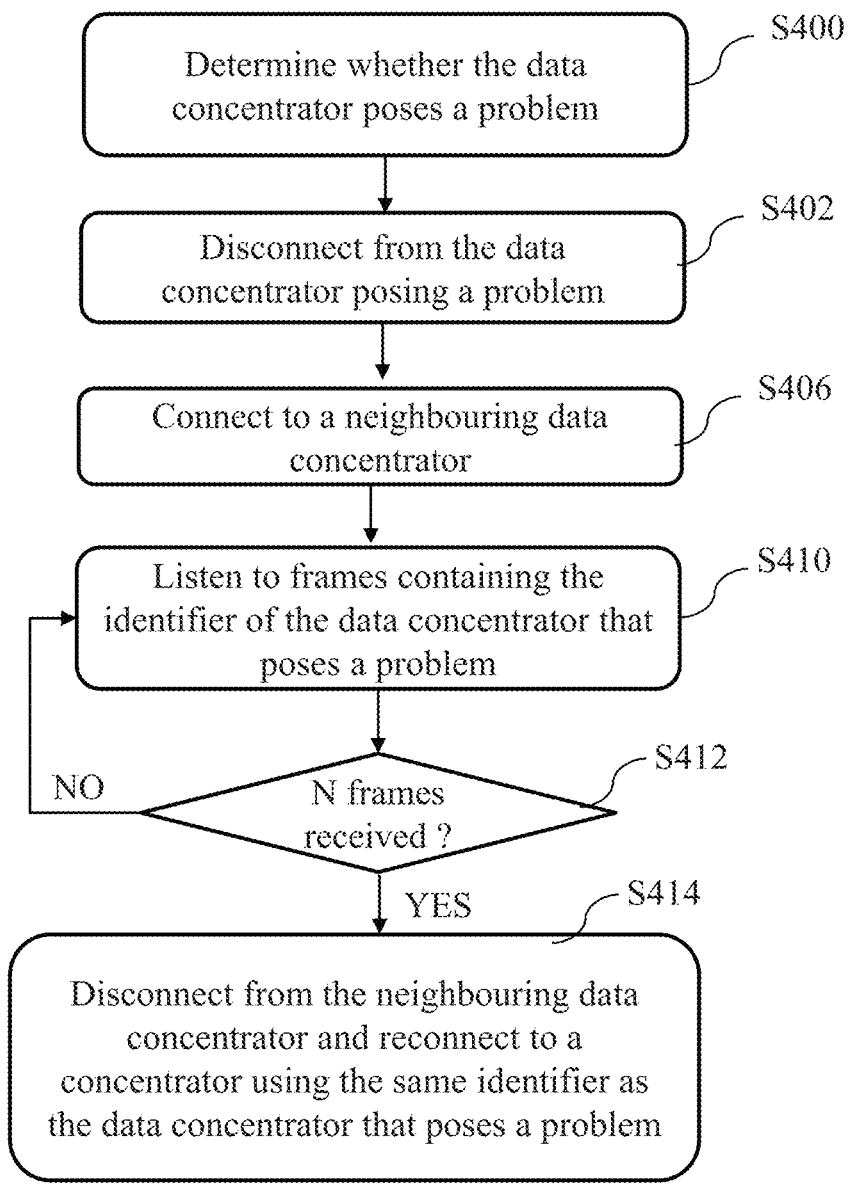
FIG. 4 illustrates schematically a method for connecting a smart electricity meter to a data concentrator according to a particular embodiment.

FIG. 4 illustrates schematically a method for connecting a smart electricity meter 122 following a problem, e.g. a breakdown, of the data concentrator 110 to which the smart electricity meter 122 is currently connected according to a particular embodiment. The method described in relation to the smart electricity meter 122 is implemented by all the smart electricity meters connected to the data concentrator 110.

In a step S400, the smart electricity meter 122 determines whether the data concentrator 110 to which it is connected is posing a problem, e.g. is broken down. In one embodiment, the smart electricity meter 122 determines that the data concentrator 110 is posing a problem when it has not received a frame from the data concentrator 110 during a predefined time T0, e.g. T0=24 h (in agreement with the aforementioned time tmin).

In a variant embodiment, the meter 122 determines that the data concentrator 122 is posing a problem when it has not received a frame from the data concentrator 110 during a predefined time T0, e.g. T0=24 h, or when it notes that the quality of frame exchanges at the application level with the data concentrator to which it is connected is insufficient and that it is listening to a neighbouring data concentrator, i.e. it is listening to the frames containing the identifier PAN-ID of the neighbouring data concentrator, to which it is not connected. The quality of frame exchanges at the application level is insufficient when, for example, the success level of frame exchanges at the application level is below a predefined threshold value TH, e.g. TH=90%. The success level of frame exchanges at the application level is equal to the level Tx of correct reception by the data concentrator 110 of the frames sent by the smart electricity meter 122. In other words, Tx=number of frames received correctly by the data concentrator/number of frames sent by the smart electricity meter. Optionally Tx is expressed as a percentage. In the case of the DLMS (the English acronym of "Device Language Message Specification") communication protocol, which functions by data block, it suffices for the data concentrator to request a data block from the smart electricity meter so that the latter knows that the preceding data block (or frame) was received correctly. On the other hand, if the data concentrator resumes the sequence at the very start, i.e. it requests the first data block again, whereas the sequence had not ended, a failure is detected by the smart electricity meter. The smart electricity meter can thus determine the number of frames received correctly by the data concentrator and consequently determine the level Tx.

In a step S402, the meter 122 disconnects from the data concentrator 110 to which it is connected in the case where said data concentrator 110 is posing a problem. This step consists of a disconnection of the logic links between the smart electricity meter 122 and the data concentrator 110.

In a step S406, the smart electricity meter 122 attaches itself to a neighbouring data concentrator, e.g. the data concentrator 12. For this purpose, the smart electricity meter 122 implements the method described with reference to FIG. 3. In particular it sends at least one beacon frame, selects a data concentrator, e.g. the data concentrator 112, from the neighbouring data concentrators that responded and attaches itself to the neighbouring data concentrator selected.

In a step S410, the smart electricity meter 122 once again listens to the frames (including the "ping" messages) containing the identifier PAN-$ID_{10}$ and waits (step S412) to receive at least N thereof, N being an integer greater than or equal to 1, e.g. N=10. In a variant embodiment, the smart electricity meter 122 waits to receive at least N thereof, with an LQI (the English acronym of "Link Quality Indicator") at least equal to $LQI_{min}$, e.g. $LQI_{min}$=64. If N frames are received then the method continues at the step S414, otherwise it resumes at the step S410.

In the step S414, the smart electricity meter 122 disconnects from the neighbouring data concentrator 112 and reconnects to the replacement data concentrator identified by the PAN-ID$_{110}$. For this purpose it implements the method described with reference to FIG. 3.

Thus the method described makes it possible automatically to rebalance the network by avoiding data concentrators, e.g. the data concentrator 112, having a large number of smart electricity meters that are connected thereto whereas other data concentrators, e.g. the new data concentrator replacing the data concentrator 110 that is posing a problem, has no or few smart electricity meters connected.

Figure 5:
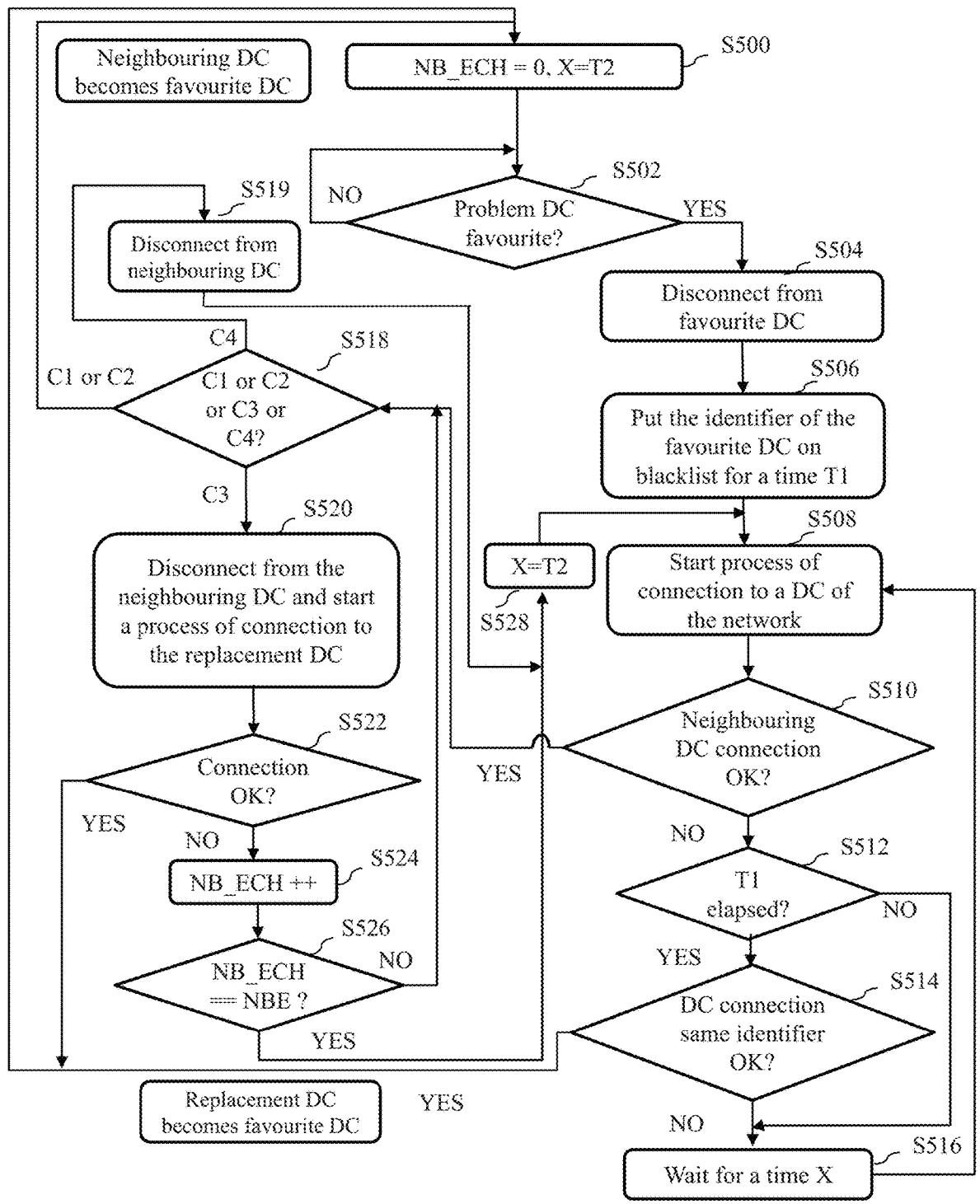
FIG. 5 illustrates schematically a method for connecting a smart electricity meter to a data concentrator according to a particular embodiment.

FIG. 5 illustrates schematically a method for connecting a smart electricity meter 122 to a data concentrator following a problem, e.g. a breakdown, with the data concentrator 110 to which the smart electricity meter 122 is currently connected according to another particular embodiment. The method described in relation to the smart electricity meter 122 is implemented by all the smart electricity meters connected to the data concentrator 110. On this figure, the term DC is used for signifying data concentrator.

In a step S500, variables NB_ECH and X are initialised: NB_ECH=0 and X=T2, e.g. T2=15 minutes. NB_ECH is a positive or zero integer that represents a number of attempts at connection to a replacement data concentrator (the identifier of which is identical to the identifier PAN-ID$_{110}$ of the data concentrator that it replaces) that have failed. T2 represents a time.

In a step S502, the smart electricity meter determines that there is a problem on the data concentrator 110 to which it has been connected without a communication anomaly since a predefined time T. For example, T is equal to 1 week. Such a data concentrator is called the favourite data concentrator or favourite DC. For each smart electricity meter, the favourite data concentrator or favourite DC therefore corresponds to the last data concentrator to which it was connected without any problem during the time T.

If the smart electricity meter determines that there is a problem on the favourite data concentrator 110, the method continues to the step S504, otherwise it resumes at the step S502.

In a particular embodiment, the smart electricity meter 122 determines that the favourite data concentrator 110 is posing a problem when it has not received a frame from the data concentrator 110 during the predefined time T0, e.g. T0=24 h. In a variant embodiment, the smart electricity meter 122 determines that the favourite data concentrator 110 is posing a problem when it has not received a frame from the data concentrator 110 during a predefined time T0, e.g. T0=24 h or when it notes that the quality of frame exchanges at the application level with its favourite data concentrator 110 is insufficient, and provided that it is listening to a neighbouring data concentrator to which it is not connected. In other words, if the smart electricity meter 122 notes that the quality of frame exchanges at the application level with its favourite data concentrator 110 is insufficient but that it is not listening to a neighbouring data concentrator to which it is not connected, the method resumes at the step S502. This is because in this case it is preferable to remain connected to the favourite data concentrator 110 even if the quality of frame exchanges is insufficient rather than risking being without a neighbouring data concentrator to which to connect.

In a step S504, the smart electricity meter 122 disconnects from the favourite data concentrator 110 to which it is connected. This step consists of a disconnection of the logic links between the smart electricity meter 122 and the data concentrator 110.

In a step S506, the smart electricity meter 122 puts the identifier PAN-ID$_{110}$ of the favourite data concentrator 110 on a blacklist for a predefined time T1, e.g. T1=24 h. In other words, during the time T1, the smart electricity meter 122 ignores the frames containing the identifier PAN-ID$_{110}$ that it receives. In other words, it stops listening to the favourite data concentrator 110.

In a step S508, the smart electricity meter 122 starts a process of connection to a data concentrator of the PLCN network 100, e.g. the data concentrator 112. For this purpose, the smart electricity meter 122 implements the method described with reference to FIG. 3. In particular, it sends at least one beacon frame BeaconRequest, selects a data concentrator, e.g. the data concentrator 112, from the data concentrators that responded and attaches itself to the data concentrator selected.

In a step S510, the smart electricity meter 122 checks whether the connection to a neighbouring data concentrator has functioned. If such is the case, then the method continues at the step S518, otherwise it continues at the step S512.

At the step S512, if the time T1 has elapsed, the method continues at the step S514, otherwise it continues at the step S516.

At the step S514, the smart electricity meter 122 checks whether it has succeeded in connecting to a replacement data concentrator with the same identifier PAN-ID$_{110}$ as the data concentrator that posed a problem. If it has succeeded then the method resumes at the step S500, the replacement data concentrator automatically becoming the new favourite DC, otherwise it continues at the step S516. At the step S516, the smart electricity meter 122 waits for a predefined time X where X is a random value between two predefined values T2 and T4, e.g. T2=15 minutes and T4=2 hours. X increases gradually at each new performance of the step S516 until it reaches T4, in which case X remains random and between T4−30 minutes and T4 and does not increase further. At the end of the waiting the method resumes at the step S508.

At the step S518, the smart electricity meter 122 checks whether at least one of the following conditions is met, and it remains at the step S518 as long as none of the conditions is met (in which case the smart electricity meter 122 remains connected to the neighbouring DC):

COND1 (C1): NB_ECH is equal to NBE, e.g. NBE=3;
COND2 (C2): a predefined time TT has elapsed as from the moment when the smart electricity meter 122 is seen connected to the neighbouring DC in the step S510, e.g. TT is equal to one week;
COND3 (C3): the smart electricity meter 122 has received at least N frames comprising the identifier of the DC that posed a problem, i.e. PAN-ID$_{110}$;
COND4 (C4), which is tested last: the neighbouring DC is posing a problem (situation identical to that of the step S502 with the neighbouring DC instead of the favourite DC, i.e. when the smart electricity meter 122 has not received a frame from the neighbouring DC to which it is connected during a predefined time T0, e.g. T0=24 h, or when it notes that the quality of frame exchanges at the application level with its neighbouring data concentrator is insufficient, and provided that it is listening to another neighbouring data concentrator to which it is not connected).

In a variant embodiment, the third condition COND3 is defined as follows: the smart electricity meter 122 has received at least N frames comprising the identifier, i.e. PAN-ID$_{110}$, of the DC that posed a problem with an LQI at least equal to LQI$_{min}$, e.g. LQI$_{min}$=64. The LQI is a value representing the quality in terms of signal-to-noise ratio of a link between two nodes of the network.

If COND1 or COND2 is met the method resumes at the step S500, the neighbouring data concentrator becoming the new favourite DC. If COND3 is met the method continues at the step S520. If COND4 is met, the method continues at the step S519.

In the step S520, the smart electricity meter 122 disconnects from the neighbouring DC to which it was connected and starts a process of connection to a DC, referred to as replacement DC, with the same identifier PAN-ID$_{110}$ as the DC that posed a problem. For this purpose, the smart electricity meter 122 implements the method described with reference to FIG. 3. In a step S522, it checks whether the connection has functioned. If such is the case, the method resumes at the step S500, the replacement DC becoming the new favourite DC. Otherwise NB_ECH is incremented by 1 in a step S524. In a step S526, NB_ECH is compared with NBE. If NB_ECH is equal to NBE, the method resumes at the step S508 after having reinitialised the variable X to the value T2 in a step S528, otherwise it resumes at the step S518.

In a step S519, the smart electricity meter 122 disconnects from the neighbouring DC to which it is connected. Then the method continues at the step S528.

In the particular case where a meter is ejected, e.g. by the sending of a "Kick" message, by its favourite DC, it then attempts to connect to a data concentrator by implementing the method described with reference to FIG. 3. The reasons for such an ejection are varied. It may be the case, for example, of forcing the smart electricity meter to connect to a DC with a different PAN-ID, or forcing the "reset" of certain communication contexts in order, after re-registration, to return to a known initial state. Consequently, this smart electricity meter does not implement the method described with reference to FIG. 5 except when the new DC to which it attaches itself becomes its favourite DC, i.e. at the end of a time T of connection without a problem.

The method described with reference to FIG. 5 also takes into account the case where the favourite DC was in transient breakdown and has restarted again, either following a reboot (remotely or on site), or by itself without its having needed a reboot, or following the disappearance of a network disturbance that prevented a connection to this DC.

Figure 6:
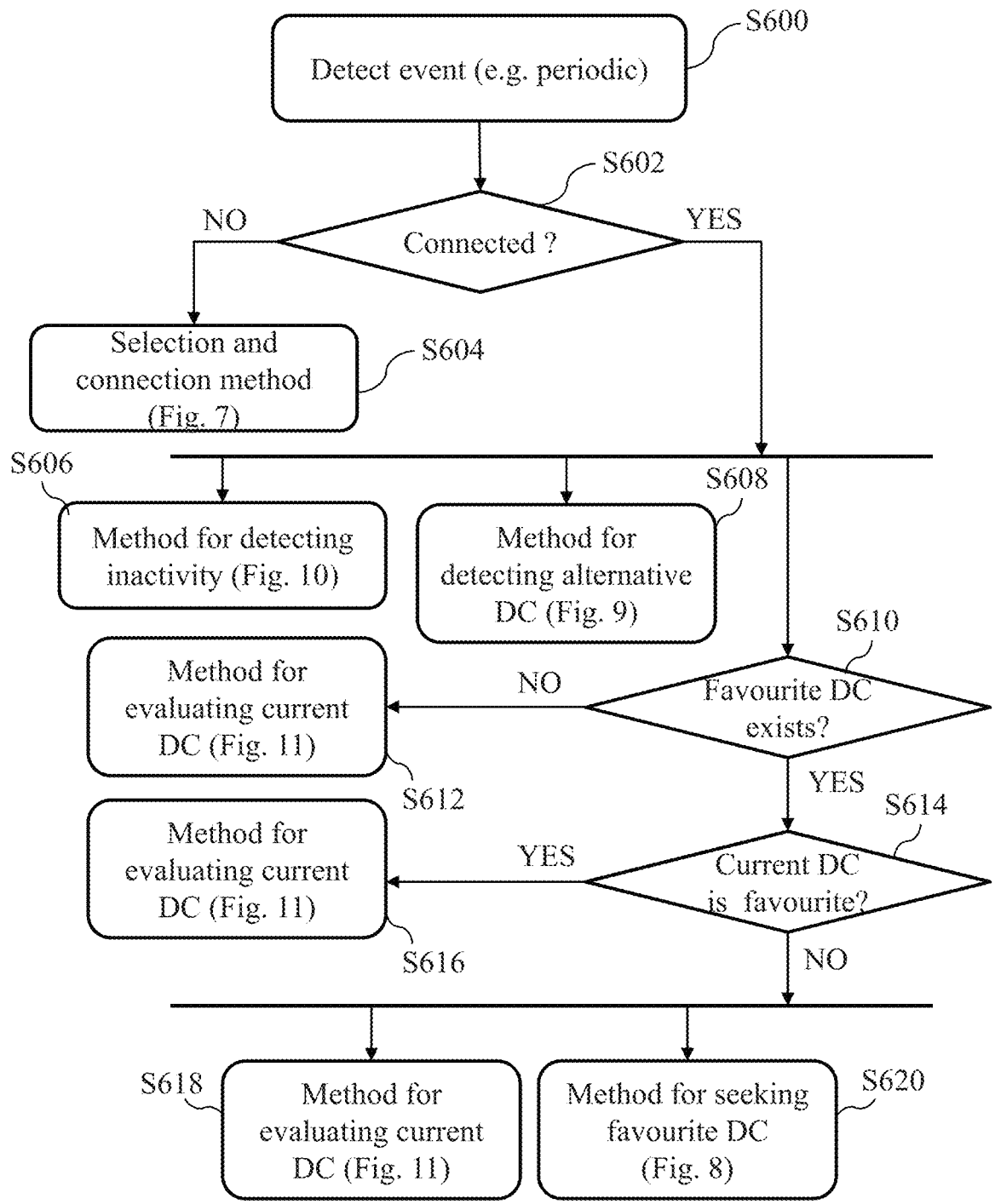
FIG. 6 illustrates schematically a method for managing connection of a smart electricity meter to a data concentrator according to a particular embodiment.

FIG. 6 illustrates schematically a method for managing connection of a smart electricity meter 122 to a data concentrator (DC) according to a particular embodiment. The method described in relation to the smart electricity meter 122 is implemented by all the smart electricity meters in the PLCN network 100. In a step S600, the smart electricity meter 122 detects an occurrence of an event. For example, the event is a periodic triggering of the algorithm of FIG. 6. According to another example, the event is a disconnection of said smart electricity meter 122.

In a step S602, the smart electricity meter 122 checks that it is connected, or attached, to a DC. If such is the case, a set of steps S606, S608 and S610 is performed; otherwise a step S604 is performed.

In the step S604, the smart electricity meter 122 implements a selection and connection method, as detailed below in relation to FIG. 7 in a particular embodiment, in order to select and connect (or attach) to a DC, optionally by means of another smart electricity meter.

In the step S606, the smart electricity meter 122 implements an inactivity detection method, as detailed below in relation to FIG. 10 in a particular embodiment, in order to detect whether the DC to which said smart electricity meter 122 is connected is still active from the point of view of said smart electricity meter 122.

In the step S608, the smart electricity meter 122 implements an alternative DC detection method, as detailed below in relation to FIG. 9 in a particular embodiment, in order to detect whether an alternative DC exists to optionally take over from the DC to which said smart electricity meter 122 is connected.

In the step S610, the smart electricity meter 122 checks whether a favourite DC exists for said smart electricity meter 122, that is to say whether a favourite DC has been defined for said smart electricity meter 122 (see in particular a step S118 described below in relation to FIG. 11). If such is the case, a step S614 is performed, otherwise a step S612 is performed.

In the step S612, the smart electricity meter 122 implements a method for evaluating the DC to which said smart electricity meter 122 is connected, as detailed below in relation to FIG. 11 in a particular embodiment. In order to evaluate the relevance of defining this DC as favourite DC (if such is not already the case) and if required disconnecting from this DC to reconnect to an alternative DC (if such an alternative DC exists).

In the step S614, the smart electricity meter 122 checks whether the DC to which said smart electricity meter 122 (current DC) is connected is the favourite DC of said smart electricity meter 122. If such is the case, a step S616 is performed; otherwise a set of steps S618 and S620 is performed.

In the step S616, the smart electricity meter 122 implements the method for evaluating the DC to which said smart electricity meter 122 is connected, as already mentioned with regard to the step S612.

In the step S618, the smart electricity meter 122 implements the method for evaluating the DC to which said smart electricity meter 122 is connected, as already mentioned with regard to the steps S612 and S616.

In the step S620, the smart electricity meter 122 implements a method for seeking the favourite DC, as detailed below in relation to FIG. 8 in a particular embodiment, in order to reconnect to the favourite DC, more particularly in the case where a replacement DC has been introduced into the PLCN network 100 to replace a DC that has posed a problem and which was the favourite DC of said smart electricity meter 122.

Figure 7:
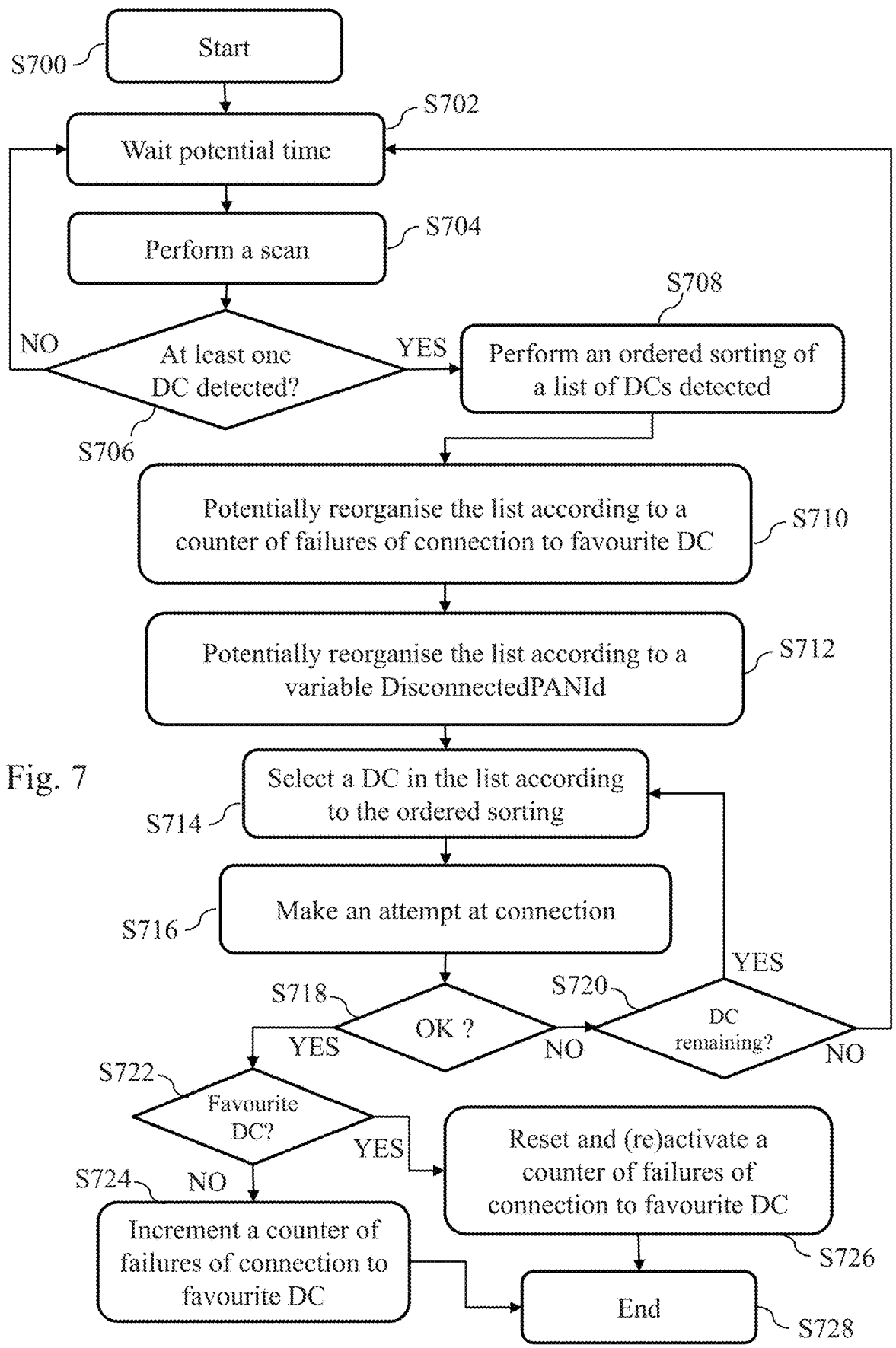
FIG. 7 illustrates schematically a method for selecting and connecting a smart electricity meter to a data concentrator in the context of the management method of FIG. 6.

FIG. 7 illustrates schematically a method for selecting and connecting a smart electricity meter 122 to a data concentrator (DC) in the context of the management method of FIG. 6. The method of FIG. 7 starts in a step S700.

In a step S702, the smart electricity meter 122 awaits a potential delay. For example, the potential delay is of a random value between 0 and an upper bound. For example, the upper bound is a multiple of a value of a counter of attempts at connection to a DC each time the algorithm of FIG. 7 is implemented. In a particular embodiment, when the step S702 is first performed at each implementation of the algorithm of FIG. 7, the smart electricity meter 122 applies a zero delay.

In a step S704, the smart electricity meter 122 performs a scan in order to discover its near environment. More precisely, the smart electricity meter 122 transmits Beacon-Request beacon frames, to which said smart electricity meter or data concentrator (DC) receiving them responds. The smart electricity meter 122 is thus capable of determining which candidate DC or DCs exist for connecting to.

In a step S706, the smart electricity meter 122 checks whether at least one DC has been detected following the scan. If such is the case, a step S708 is performed; otherwise the step S702 is repeated, potentially forcing the application of a non-zero delay.

In the step S708, the smart electricity meter 122 performs an ordered sorting of a list L of the DCs detected (in the case where a plurality of DCs have been detected during the scan) according to a quality of communication for each DC (or PAN) detected. In a particular embodiment, the smart electricity meter 122 retains in the list L a single smart electricity meter or data concentrator PAN, typically for one having the best communication conditions (e.g. LQI).

In a step S710, the smart electricity meter 122 potentially organises the list L according to a counter of failures of connection to the favourite DC. More precisely, if the following criteria are met:
- the favourite DC is defined for said smart electricity meter 122;
- the favourite DC is identified in the associated list L (e.g. by its associated PAN-ID identifier); and
- the value of the counter of failures of connection to the favourite DC is below a predefined threshold T7 (for example T7 is equal to 3);
- then the favourite DC is placed at the start of the list L. Thus a connection to the favourite DC will be attempted first.

In a step S712, the smart electricity meter 122 potentially reorganises the list L according to information indicating from which DC said smart electricity meter 122 has disconnected last, for example as indicated in a variable DisconnectedPANId. More precisely, if the DC in question is identified in the list L (e.g. by its associated identifier PAN-ID), then the DC in question is placed at the end of the list L. Thus a connection to any other DC will be attempted before the smart electricity meter 122 has had to reconnect to the DC from which said smart electricity meter 122 has just disconnected.

In a step S714, the smart electricity meter 122 selects a DC in the list L. At each iteration of the step S714, the smart electricity meter 122 selects a DC in the order of the list L.

In a step S716, the smart electricity meter 122 makes an attempt at connection (or attachment) to the DC selected at the step S714. As already mentioned, this step generally comprises the authentication of the smart electricity meter 122 by exchanging identification data between the smart electricity meter and the DC as required through smart electricity meters serving as relays.

In a step S718, the smart electricity meter 122 checks whether the attempt at connection of the step S714 has taken place successfully. If such is the case, a step S722 is performed; otherwise a step S720 is performed.

In the step S720, the smart electricity meter 122 checks whether at least one DC remains in the list L for which no attempt at connection has been made, if such is the case, the step S714 is repeated by selecting another DC remaining in the list L; otherwise the step S702 is repeated, potentially by increasing the waiting time.

In the step S722, the smart electricity meter 122 checks whether the DC to which said smart electricity meter 122 has connected is the favourite DC of said smart electricity meter 122. If such is the case, a step 726 is performed; otherwise a step S724 is performed.

In the step S724, the smart electricity meter 122 increments by one unit the counter of failures of connection to its favourite DC. Then a step S728 is performed, in which the algorithm of FIG. 7 is ended.

In the step S726, the smart electricity meter 122 resets and reactivates the counter of failures of connection to its favourite DC. Then the step S728 is performed.

Figure 8:
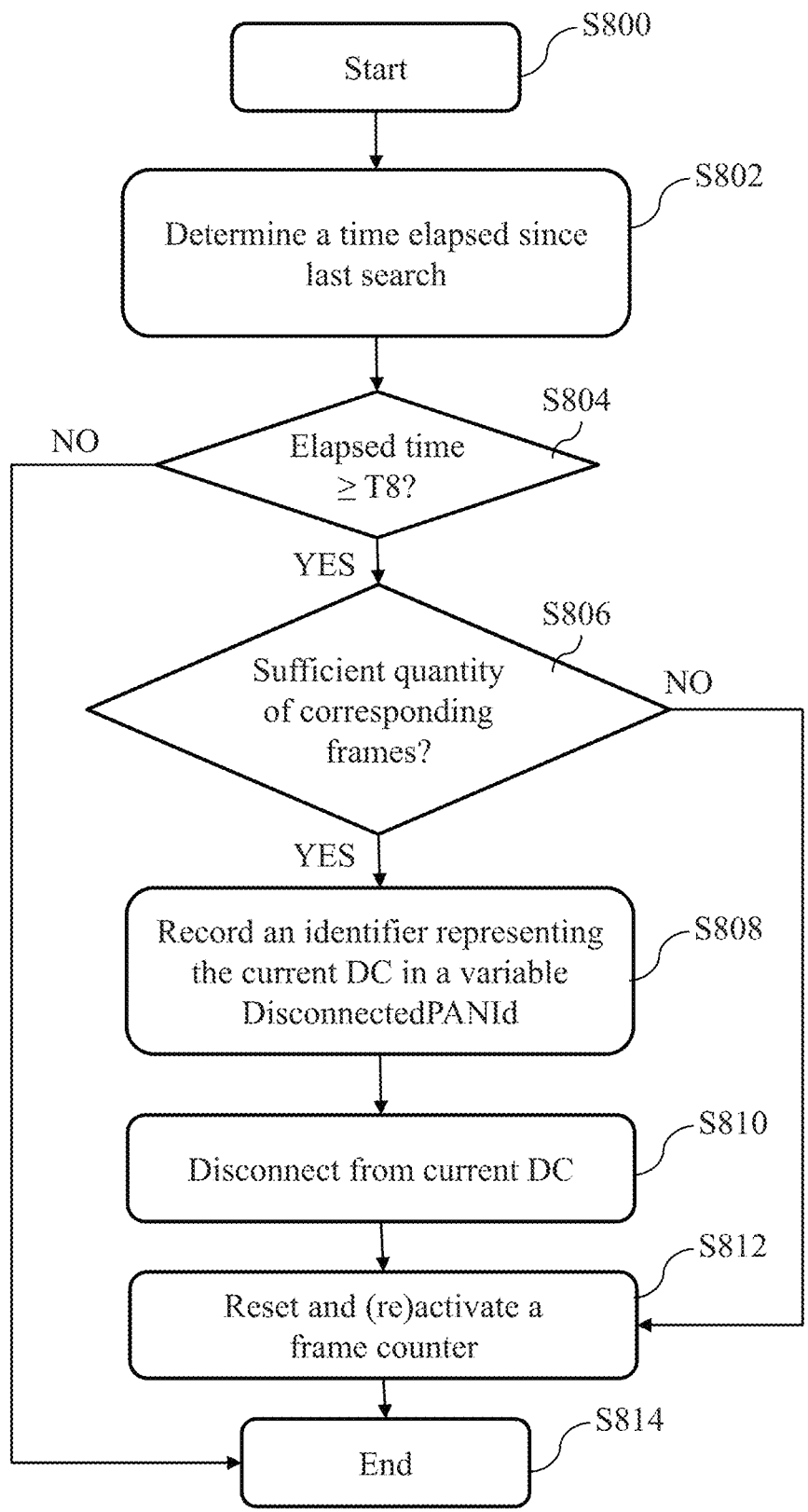
FIG. 8 illustrates schematically a method for seeking a favourite data concentrator in the context of the management method of FIG. 6.

FIG. 8 illustrates schematically a method for seeking the favourite DC in the context of the management method of FIG. 6. The method of FIG. 8 starts in a step S800.

In a step S802, the smart electricity meter 122 determines a time elapsed since the last search with a favourite DC.

In a step S804, the smart electricity meter 122 checks whether the elapsed time in question is greater than or equal to a predefined time T8. For example, the predefined threshold time T8 is equal to 3 hours. If such is the case, a step S806 is performed; otherwise a step S814 is performed, wherein the method of FIG. 8 is ended.

In the step S806, the smart electricity meter 122 checks whether a quantity of frames received from a DC other than the one to which said smart electricity meter 122 is connected (or attached), where this other DC is the favourite DC of said smart electricity meter 122, is sufficient for reconnecting to said favourite DC. For example, the smart electricity meter 122 checks whether said quantity of frames is greater than or equal to a predefined threshold quantity QFF (e.g. QFF=100). If such is the case, a step S808 is performed; otherwise a step S812 is performed.

In the step S808, the smart electricity meter 122 records information indicating from which DC said smart electricity meter 122 has last disconnected. Thus, for example, the smart electricity meter 122 records an identifier representing said DC (typically its associated identifier PAN-ID) in the variable DisconnectedPANId. Then, in a step S810, the smart electricity meter 122 disconnects from the DC in question, and the step S812 is next performed. Then, by applying the algorithm of FIG. 6, the smart electricity meter 122 will reconnect to its favourite DC. Thus, when the favourite DC of the smart electricity meter 122 has encountered a problem and has been replaced, the smart electricity meter 122 will reconnect to the replacement DC that was introduced into the PLCN network 100.

In the step S812, the smart electricity meter 122 resets a frame counter (the one used for determining the aforementioned quantity of frames at the step S806) and reactivates it (or activates it for the very first performance of the step S812). Then the algorithm in FIG. 8 is ended in the step S814.

Figure 9:
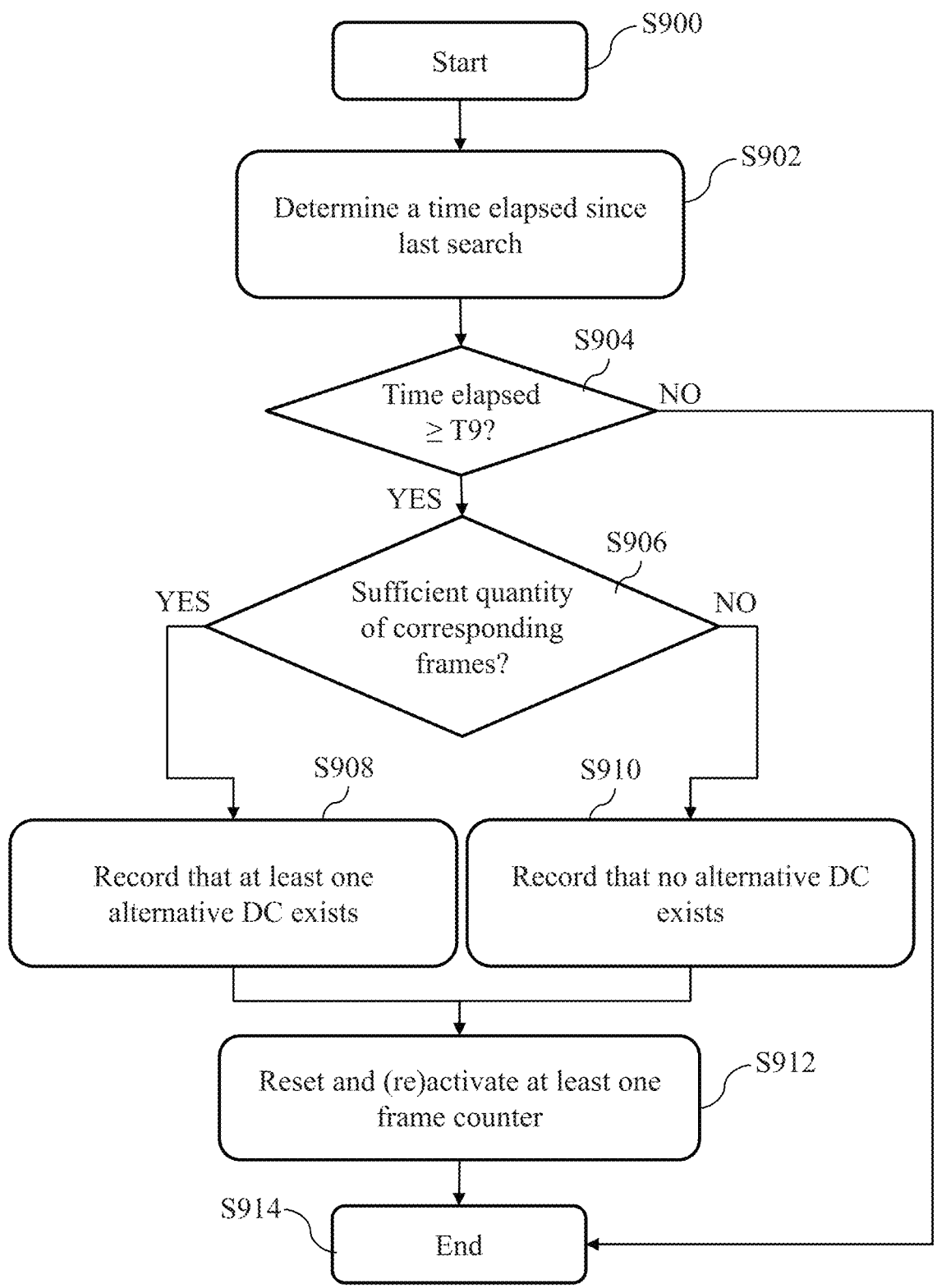
FIG. 9 illustrates schematically a method for detecting an alternative data concentrator in the context of the management method of FIG. 6.

FIG. 9 illustrates schematically a method for seeking (or detecting) an alternative DC in the context of the management method of FIG. 6. The method of FIG. 9 starts in a step S900.

In a step S902, the smart electricity meter 122 determines a time elapsed since the last seeking of an alternative DC.

In a step S904, the smart electricity meter 122 checks whether the elapsed time in question is greater than or equal to a predefined threshold time T9. For example, the predefined threshold time T9 is equal to 6 hours. If such is the case, a step S906 is performed; otherwise a step S914 is performed, in which the method of FIG. 9 is ended.

In the step S906, the smart electricity meter 122 checks whether a quantity of frames received from a DC other than the one to which said smart electricity meter 122 is connected (or attached) is sufficient for reconnecting, if required, to this other DC (alternative DC). For example, the smart electricity meter 122 checks whether said quantity of frames if greater than or equal to a predefined threshold quantity QFA (e.g. QFA=100). It should be noted that there may be a plurality of other DCs that meet the above condition, in which case a plurality of alternative DCs are available. If at least one other DC is thus detected, a step S908 is performed; otherwise a step S910 is performed.

In the step S908, the smart electricity meter 122 records that there is at least one alternative DC to which said smart electricity meter 122 has the possibility of attaching. For example, the smart electricity meter 122 records this information by means of a Boolean AlternatePANPresent with the value "TRUE". Then a step S912 is performed.

In the step S910, the smart electricity meter 122 records that there is not an alternative DC to which said smart electricity meter 122 has the possibility of attaching. For example, the smart electricity meter 122 records this information by means of the Boolean AlternatePANPresent with the value "FALSE". Then a step S912 is performed.

In the step S912, the smart electricity meter 122 resets at least one frame counter (the one or the ones used for determining the aforementioned quantity of frames at the step S906) and reactivates it or them (or activates it or them for the very first performance of the step S912). Then the algorithm in FIG. 9 is ended in the step S914.

Figure 10:
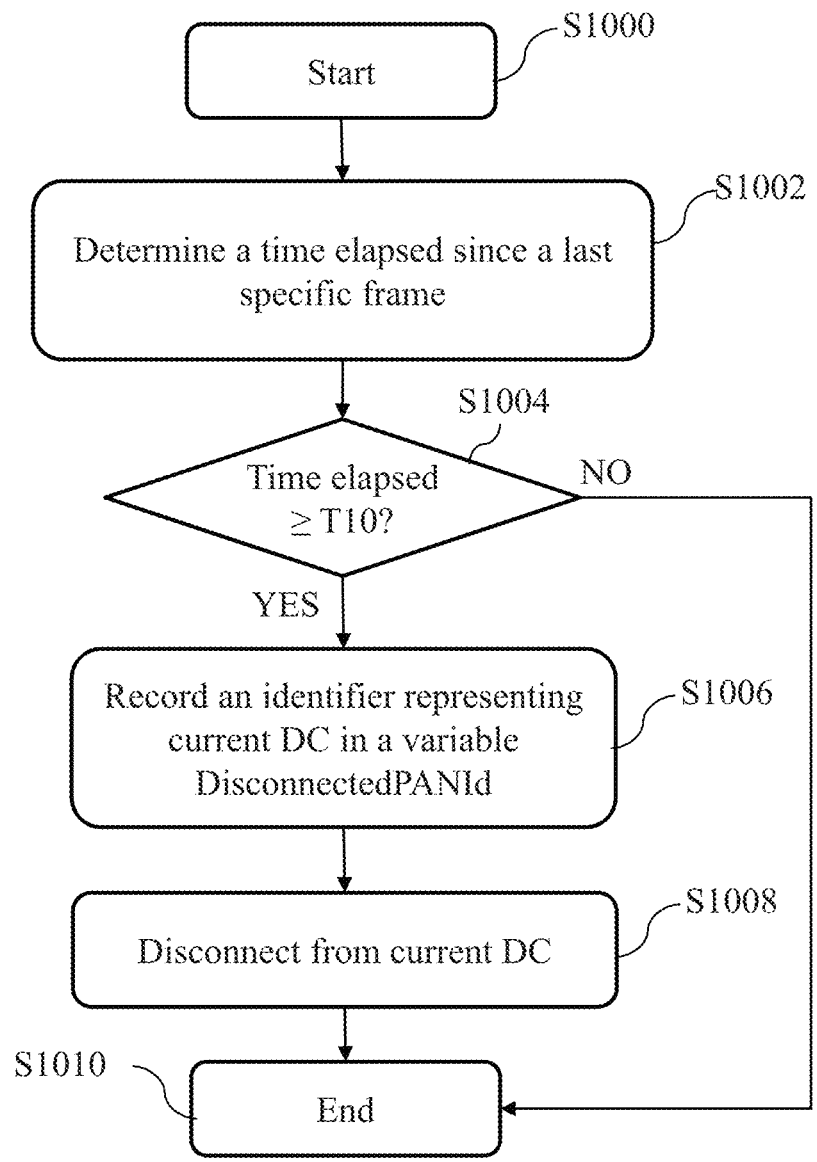
FIG. 10 illustrates schematically a method for detecting inactivity in the context of the management method of FIG. 6.

FIG. 10 illustrates schematically a method for detecting inactivity in the context of the management method of FIG. 6. The method of FIG. 10 starts in a step S1000. In a step S1002, the smart electricity meter 122 determines a time elapsed since the last reception of a specific frame representing an activity of the DC to which the smart electricity meter 122 is connected (or attached). The specific frame in question is for example a frame in accordance with the DLMS communication protocol or a frame in accordance with the ICMP communication protocol (the English acronym for "Internet Control Message Protocol").

In a step S1004, the smart electricity meter 122 checks whether the elapsed time in question is greater than or equal to a predefined threshold time T10 (equivalent to T0 in the context of FIGS. 4 and 5). For example, the predefined threshold time T10 is equal to 24 hours. If such is the case, the smart electricity meter 122 considers that the DC in question is posing a problem, and a step S1006 is performed; otherwise this means that the DC in question is still active and is not posing a problem, and a step S1010 is performed, in which the method of FIG. 10 is ended.

In the step S1006, the smart electricity meter 122 records information indicating from which DC said smart electricity meter 122 has last disconnected. Thus, for example, the smart electricity meter 122 records an identifier representing said DC (typically its associated identifier PAN-ID) in the variable DisconnectedPANId. Then, in a step S1008, the smart electricity meter 122 disconnects from the DC in question, and the method in FIG. 10 is ended in the step S1010. Then, by applying the algorithm in FIG. 6, the smart electricity meter 122 will reconnect to an alternative DC. This case can in particular arise when the smart electricity meter 122 was connected to its favourite DC and the latter must be replaced following a problem encountered.

The approach described in relation to FIG. 10 for determining that the DC in question is posing a problem can be applied in the context of the methods described above in relation to FIGS. 4 and 5.

Figure 11:
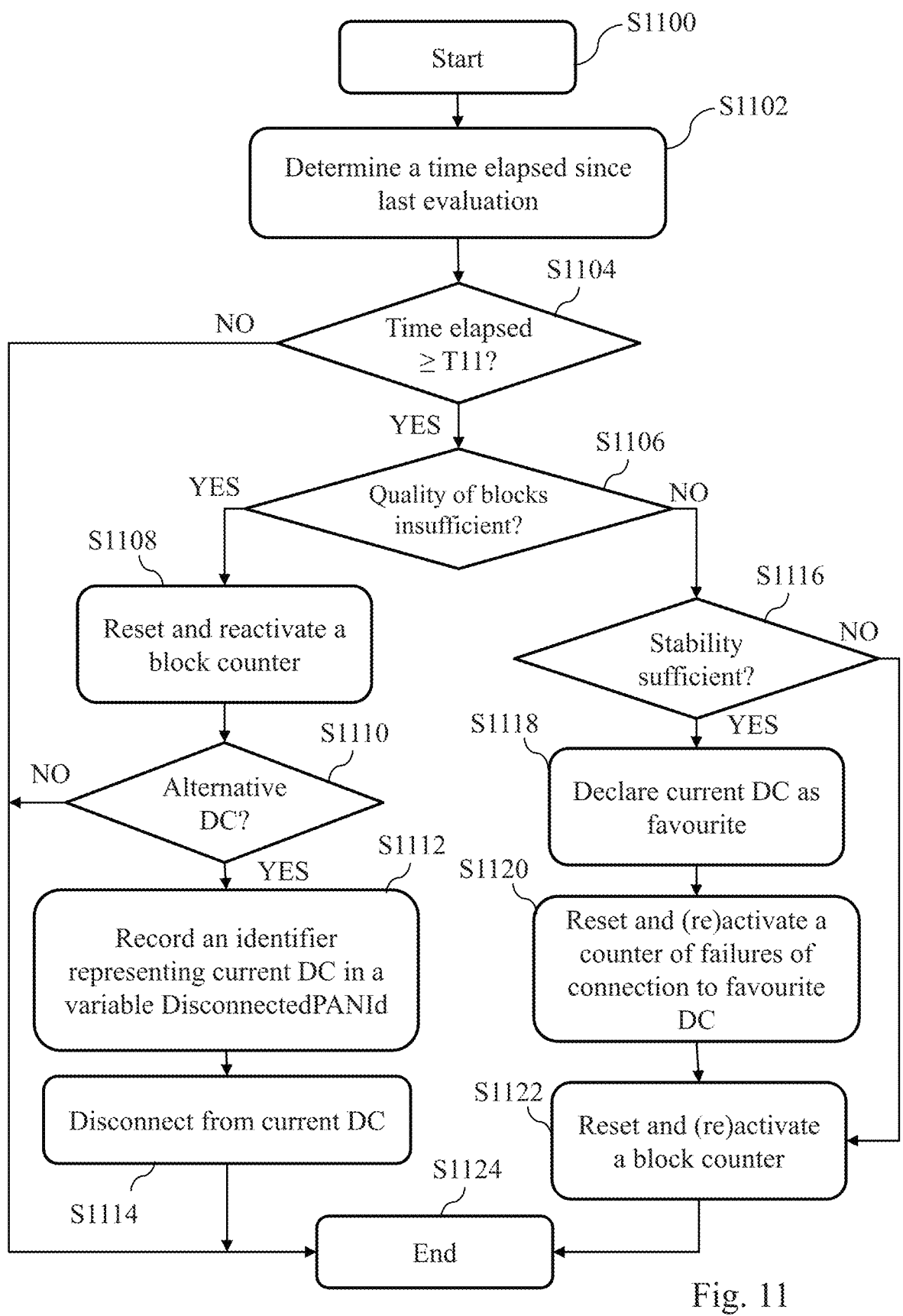
FIG. 11 illustrates schematically a method for evaluating a current data concentrator in the context of the management method of FIG. 6.

FIG. 11 illustrates schematically a method for evaluating the DC to which the smart electricity meter 122 (current DC) is connected (or attached) in the context of the management method of FIG. 6. The method in FIG. 11 starts in a step S1100.

In a step S1102, the smart electricity meter 122 determines a time elapsed since the last evaluation of the DC to which the smart electricity meter 122 is connected (or attached).

In a step S1104, the smart electricity meter 122 checks whether the elapsed time in question is greater than or equal to a predefined threshold time T11. For example, the predefined threshold time T11 is equal to 6 hours. If such is the case, a step S1106 is performed; otherwise a step S1124 is performed, in which the algorithm in FIG. 11 is ended.

In the step S1106, the smart electricity meter 122 checks whether the quality of the data blocks received in frames (potentially relayed) coming from the DC to which the smart electricity meter 122 is connected (or attached) is insufficient. For example, the smart electricity meter 122 checks whether incomplete data blocks are received in frames (potentially relayed) coming from the DC to which the smart electricity meter 122 is connected (or attached) in a quantity greater than or equal to a predefined threshold quantity T12. For example, in the context of transfer of data blocks in accordance with the DLMS communication protocol, T12=6. An error rate can also be considered. If the quality of the data blocks received is insufficient, a step S1106 is performed; otherwise a step S1116 is performed.

In the step S1108, the smart electricity meter 122 resets a block counter (the one used, in a particular embodiment, for determining the quantity of incomplete blocks at the step S1106) and reactivates it. Then a step S1110 is performed. In the step S1110, the smart electricity meter 122 checks whether an alternative DC exists. For example, as already mentioned, this information can be stored in the Boolean AlternatePANPresent, with the value "TRUE" in the case of the presence of an alternative DC or with the value "FALSE" in the case of absence of an alternative DC. If an alternative DC exists, a step S1112 is performed; otherwise a step S1124 is performed, in which the algorithm in FIG. 11 is ended.

In the step S1112, the smart electricity meter 122 records information indicating from which DC said smart electricity meter 122 last disconnected. Thus, for example, the smart electricity meter 122 records an identifier representing said DC (typically its associated identifier PAN-ID) in the variable DisconnectedPANId. Then, in a step S1114, the smart electricity meter 122 disconnects from the DC in question, and the step S1124 is next performed. Then, in application of the algorithm of FIG. 6, the smart electricity meter 122 will seek to reconnect to a DC having a better quality of communication, and preferably to its favourite DC.

In the step S1116, the smart electricity meter 122 checks whether the DC to which said smart electricity meter 122 is connected (or attached) has sufficient stability to become the favourite DC of said smart electricity meter 122 (if the DC in question is not already the favourite DC of said smart electricity meter 122). For example, the smart electricity meter 122 checks whether a time elapsed since the last error in communication with the DC in question is greater than or equal to a predefined threshold time T13. In other words, the smart electricity meter 122 checks whether a time elapsed without communication anomaly with the DC in question is greater than or equal to the predefined threshold time T13 (equivalent to the predefined time T mentioned in relation to FIGS. 4 and 5). For example, T13 is equal to 1 week. If such is the case, a step S1118 is performed; otherwise a step S1122 is performed.

In a step S1118, the smart electricity meter 122 declares the DC to which said smart electricity meter 122 is connected (or attached) are favourite DC. Thus, for example, the smart electricity meter 122 records an identifier representing said DC (typically its associated identifier PAN-ID) in a variable UsualPANId. Then, in a step S1120, the smart electricity meter 122 resets and reactivates (or activates in the case of first declaration of a favourite DC for said smart electricity meter 122) the counter of failures of connection to its favourite DC. Then the step S1122 is performed.

In the step S1122, the smart electricity meter 122 resets the block counter (the one used, in a particular embodiment, for determining the quantity of incomplete blocks at the step S1106) and reactivates it (or activates it for the very first performance of the step S1122). Then the step S1124 is performed.

The invention claimed is:

1. A method for reconnecting a smart electricity meter connected to a data concentrator, referred to as the current data concentrator, in a powerline or radio-frequency communication network for automated metering management in the context of an electrical distribution service, the method being characterised in that it comprises the following steps performed by the smart electricity meter:
   disconnecting from the current data concentrator in the case where the current data concentrator is posing a problem;
   connecting to a neighbouring data concentrator different from the current data concentrator;
   listening to the frames containing an identifier of the current data concentrator;
   disconnecting from the neighbouring data concentrator and reconnecting to a data concentrator using the same identifier as the current data concentrator when at least N frames containing the identifier of the current data concentrator are received, with N an integer greater than or equal to 1.

2. The method according to claim 1, wherein disconnecting from the neighbouring data concentrator and reconnecting to a data concentrator using the same identifier as the current data concentrator when at least N frames containing the identifier of the current data concentrator are received comprises disconnecting from the neighbouring data concentrator and reconnecting to a data concentrator using the same identifier as the current data concentrator when at least N frames containing the identifier of the current data concentrator are received and a quality of link between the smart electricity meter and the data concentrator using the same identifier as the current data concentrator is above a predefined threshold value.

3. The method according to claim 1, comprising a step consisting in determining that the current data concentrator is posing a problem when the smart electricity meter has received no frame from the current data concentrator during a predefined time T0.

4. The method according to claim 3, wherein the method comprises a step consisting in determining that the current concentrator is posing a problem when the smart electricity meter has received no frame from the current data concentrator during a predefined time T0 or the quality of exchanges of frames between the smart electricity meter and the current data concentrator is insufficient, and provided that the smart electricity meter is listening to a neighbouring data concentrator different from the current data concentrator.

5. The method according to claim 1, comprising a step consisting in determining that the current data concentrator is posing a problem when a time elapsed since the last reception by the smart electricity meter of a specific frame representing an activity of the current data concentrator is greater than or equal to a predefined time T0.

6. The method according to claim 3, wherein T0 is equal to 24 hours.

7. The method according to claim 1, wherein the current data concentrator is a data concentrator, referred to as the favourite data concentrator, for which the connection with the smart electricity meter has operated without anomaly for a predefined time T.

8. The method according to claim 7, wherein T is equal to one week.

9. The method according to claim 7, wherein the smart electricity meter establishes an ordered list L of data concentrators to which potentially to connect, the smart electricity meter reorganises the list L by placing the favourite data concentrator at the start of the list if the value of a counter of failures of connection to the favourite data concentrator is below a predefined threshold T7, and the smart electricity meter reorganises the list L by placing the neighbouring data concentrator from which the smart electricity meter has disconnected at the end of the list.

10. The method according to claim 9, wherein T7 is equal to 3.

11. The method according to claim 1, wherein connecting to a neighbouring data concentrator comprises:
    putting the identifier of the current data concentrator on a blacklist for a predefined time T1;
    starting a process of connection to a data concentrator of the network to connect to a neighbouring data concentrator different from the current data concentrator.

12. The method according to claim 11, wherein T1 is equal to 24 hours.

13. A smart electricity meter connected to a data concentrator, referred to as the current data concentrator, in a powerline to radio-frequency communication network for automated meter management in the context of an electrical distribution service, the smart electricity meter comprising:
    electronic circuitry configured for:
    disconnecting from the current data concentrator in the case where the current data concentrator is posing a problem;
    connecting to a neighbouring data concentrator different from the current data concentrator;
    listening to frames containing the identifier of the current data concentrator;
    disconnecting from the neighbouring data concentrator and for connecting to a data concentrator using the same identifier as the current data concentrator when at least N frames are received, with N an integer greater than or equal to 1.

14. A non-transitory computer-readable storage medium that stores a computer program comprising instructions for implementing the reconnection method according to claim 1 when the program is executed by a processor.

* * * * *